US008694287B2

(12) United States Patent
Capeleto et al.

(10) Patent No.: US 8,694,287 B2
(45) Date of Patent: Apr. 8, 2014

(54) METHOD OF DESIGNING OPTICAL SYSTEMS AND CORRESPONDING OPTICAL SYSTEM

(75) Inventors: Simone Capeleto, Padua (IT); Katrin Schroll, Matzing (DE); Simon Schwalenberg, Donaustauf (DE); Ulrich Streppel, Regensburg (DE)

(73) Assignee: OSRAM Gesellschaft mit beschrankter Haftung, Munich (DE)

( * ) Notice: Subject to any disclaimer, the term of this patent is extended or adjusted under 35 U.S.C. 154(b) by 396 days.

(21) Appl. No.: 13/124,737

(22) PCT Filed: Oct. 7, 2009

(86) PCT No.: PCT/EP2009/063001
§ 371 (c)(1), (2), (4) Date: Apr. 18, 2011

(87) PCT Pub. No.: WO2010/043518
PCT Pub. Date: Apr. 22, 2010

(65) Prior Publication Data

US 2011/0208489 A1 Aug. 25, 2011

(30) Foreign Application Priority Data

Oct. 16, 2008 (EP) .................................... 08166835

(51) Int. Cl.

| | |
|---|---|
| ***G06F 17/50*** | (2006.01) |
| ***G06G 7/48*** | (2006.01) |
| ***G06G 7/56*** | (2006.01) |

(52) U.S. Cl.
USPC .................................................. 703/1; 703/5

(58) Field of Classification Search
USPC .......................................... 703/1, 5; 351/177
See application file for complete search history.

(56) References Cited

U.S. PATENT DOCUMENTS

| | | | | |
|---|---|---|---|---|
| 5,444,520 | A * | 8/1995 | Murano | 399/221 |
| 5,671,077 | A * | 9/1997 | Imakawa et al. | 359/204.1 |
| 7,314,291 | B2 * | 1/2008 | Tain et al. | 362/294 |
| 7,918,582 | B2 * | 4/2011 | Curran et al. | 362/231 |

(Continued)

FOREIGN PATENT DOCUMENTS

| | | |
|---|---|---|
| EP | 1 117 894 | 12/2003 |
| EP | 1 112 433 | 1/2004 |

(Continued)

OTHER PUBLICATIONS

Hsu, Yi-Cheng et al., "Failure Mechanisms Associated with Lens Shape of High-Power LED Modules in Aging Test", Feb. 2008, IEEE Transactions on Electron Devices, vol. 55, No. 2.*

*Primary Examiner* — Kamini S Shah
*Assistant Examiner* — Cedric D Johnson
(74) *Attorney, Agent, or Firm* — Cozen O'Connor

(57) ABSTRACT

An optical system including at least one light source, such as a LED source (10), and an optics (30) subjected to aging as a result of exposure to the light source (10) is designed by: defining an aging model for the optics (30), defining a thermal model for the light source (10, 100) as a spatial function representative of the temperature generated by the light source (10, 100), and defining the distance of the optics (30) from the light source (10) as a function of the aging model and the thermal model. The optical overall system (single or multiple reflector and lens) is finally optimised starting from the results achieved in the previous steps.

13 Claims, 3 Drawing Sheets

(56) References Cited

U.S. PATENT DOCUMENTS

| | | | | |
|---|---|---|---|---|
| 2002/0021573 | A1 | 2/2002 | Zhang | |
| 2004/0105264 | A1 | 6/2004 | Spero | |
| 2005/0024887 | A1 * | 2/2005 | Boxler | 362/498 |
| 2006/0095214 | A1 | 5/2006 | Wolff et al. | |

FOREIGN PATENT DOCUMENTS

| | | |
|---|---|---|
| WO | WO 00/12859 | 3/2000 |
| WO | WO 00/12860 | 3/2000 |
| WO | WO 2007/109308 | 9/2007 |

* cited by examiner

METHOD OF DESIGNING OPTICAL SYSTEMS AND CORRESPONDING OPTICAL SYSTEM

RELATED APPLICATIONS

This is a U.S. national stage of application No. PCT/EP2009/063001, filed on Oct. 7, 2009.

This application claims the priority of European application no. 08166835.2 filed Oct. 16, 2008, the entire content of which is hereby incorporated by reference.

FIELD OF THE INVENTION

This disclosure relates to design methods and more specifically to methods of designing optical systems.

This disclosure was devised by paying specific attention to its possible use in designing optical systems for lighting sources such as LED lighting sources.

BACKGROUND OF THE INVENTION

Design methods are increasingly drawing attention as a key area of technology. For instance, EP-B-I 112 433 claims a method of designing a roller cone drill bit by calculating certain volumes of formation cut by each tooth in the bit and adjusting correspondingly at least one geometric parameter of the design of the bit. EP-B-I 117 894 again claims a method of designing a roller cone bit by adjusting the orientation of at least one tooth on a cone of the bit, recalculating certain ratios and trajectories and adjusting the orientation of the tooth again in accordance with a recalculated value of the tooth.

High-flux light sources such as LEDs constitute a strong source of heat. High efficiency and high reliability of the associated optical system used for shaping the outgoing light beam is a mandatory requirement. In optical systems including lenses operating on a TIR (Total Internal Reflection) approach, a compromise is usually pursued between cost, efficiency and long lifetime.

Different types of optics may be selected to that end.

A first possible selection is glass optics. These have no reliability limitations in respect of high temperatures: glass can come directly into contact with a high temperature light source without being damaged. Glass optics, however, are rather expensive and usually require an additional holder: achieving complex shapes, possibly including legs or similar formations for fixing to the rest of the light module, is generally difficult in glass optics.

A second possible selection is represented by plastics optics. These are cheap and practical, and can be easily incorporated to a single piece performing both an optical function and a self-holding function. However, operating plastics optics at high temperatures may be critical.

A third possible selection is represented by so-called silicon optics. These represent a sort of trade-off between glass and plastics, in that they are more tolerant to high temperatures in comparison to plastics, while being cheaper with respect to glass optics. However, their mechanical properties may be critical (high thermal expansion, difficulties in achieving complex and/or accurate shapes, inability to be glued).

In this scenario, plastics optics represent the preferred choice for those lighting modules intended to be manufactured in high quantities (high-volume production).

OBJECT AND SUMMARY OF THE INVENTION

One object of the present invention is to provide inexpensive; high-reliability and compact optical systems including plastics optics while ensuring good reliability and efficiency as a function of the light source characteristics.

This and other objects are attained in accordance with one aspect of the present invention directed to a method of designing an optical system including at least one light source and an optics subjected to aging as a result of exposure to said at least one light source, wherein the method comprises the steps of: defining a thermal aging model for said optics; defining a thermal model for said at least one light source wherein said thermal model is a spatial function representative of the temperature generated by said at least one light source; and defining the distance of said optics from said at least one light source as a function of said aging model and said thermal model.

An embodiment of the arrangement described herein makes it possible to establish an air gap between a high temperature light source (e.g. one or more LEDs) and an associated plastics optics in order to guarantee that the temperature to which the plastics is exposed to does not exceed a defined threshold thus achieving the required lifetime; at the same time, the distance (height) of the lens with respect to the light (and heat) source is optimized in order to avoid that an excessive amount of light escapes the optical system, thus decreasing the overall optical efficiency of the lighting source.

BRIEF DESCRIPTION OF THE DRAWINGS

The invention will now be described, by way of example only, by referring to the drawings, wherein.

DETAILED DESCRIPTION OF THE DRAWINGS

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments. Reference throughout this specification to “one embodiment” or “an embodiment” means that a particular feature, structure, or characteristic described in connection with the embodiment is included in at least one embodiment. Thus, the appearances of the phrases “in one embodiment” or “in an embodiment” in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
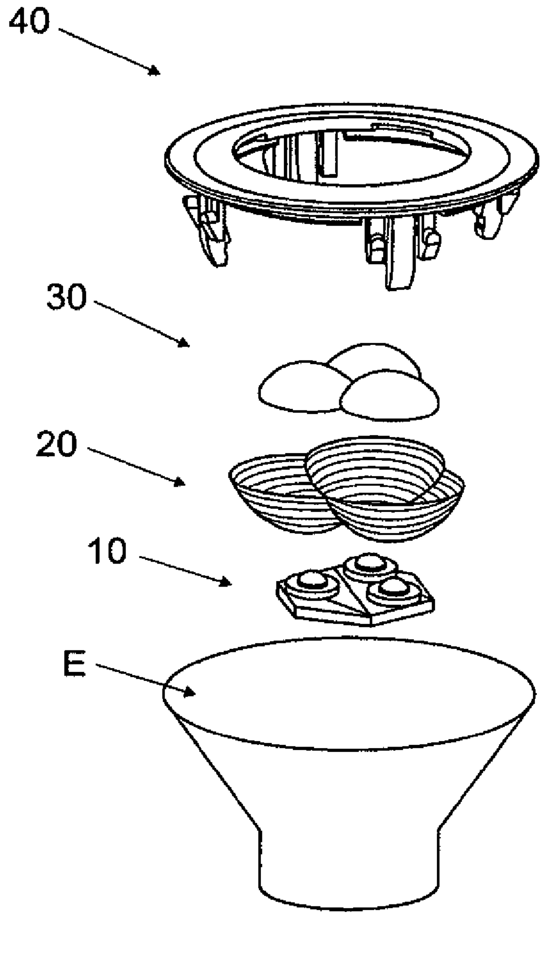
FIG. 1 is a schematic representation of an optical system as referred to in the following.

FIG. 1 is schematically representative of an optical lighting system including a LED light source 10.

In the exemplary embodiment illustrated herein, the light source 10 is a multi-LED light source including e.g. a plurality (e.g. three) LEDs having different emission wavelengths. Such a multi-LED source permits to generate a “white” light having a preselected colour temperature depending on the relative intensities of variation produced by its LED. Also, such an arrangement can be used to produce a coloured radiation.

Reference 20 denotes a reflector which in the multi-LED exemplary embodiment illustrated herein has a corresponding multi-lobed structure, with each lobe playing the role of a respective reflector for one of the light modules in the source 10.

Reference numeral 30 denotes a corresponding plurality of lenses (i.e. an "optics"), again each lens intended to cooperate with a respective one of the LEDs in the source 10. While playing individual roles, the lenses 30 may be either separate independent elements or be integrated to a single piece of plastics material as described herein.

Finally, reference 40 denotes a transparent cover intended to cover the whole arrangement (which is then mounted in an enclosure E whose outline is indicated is broken lines) while permitting propagation of the radiation.

Other than for the design method and details discussed in the following the arrangement illustrated in FIG. 1 is a conventional arrangement admitting a wide variety of possible variants known to the person skilled in the art, thereby making it unnecessary to provide a more detailed description herein.

Properly designing an optical system as shown in FIG. 1 requires determining a minimum (optimum) distance between the LED module 10 and the plastics optics 30.

Figure 2:
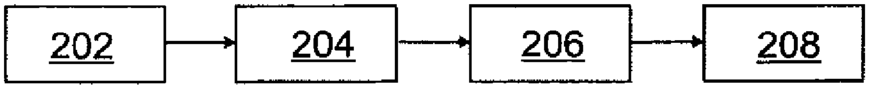
FIGS. 2 and 3 are flow charts illustrative of a design method as described herein.

FIG. 2 is representative of a sequence of steps starting from an input step 202 where the expected lifetime for the optics 30 is input to a computing system (of a known type). The data input in step 202 are processed according to an aging model (step 204) as well as a thermal model (step 206) of the light module in order to determine, in a step 208, a minimum distance of the optics 30 from the light source 10.

Figure 3:
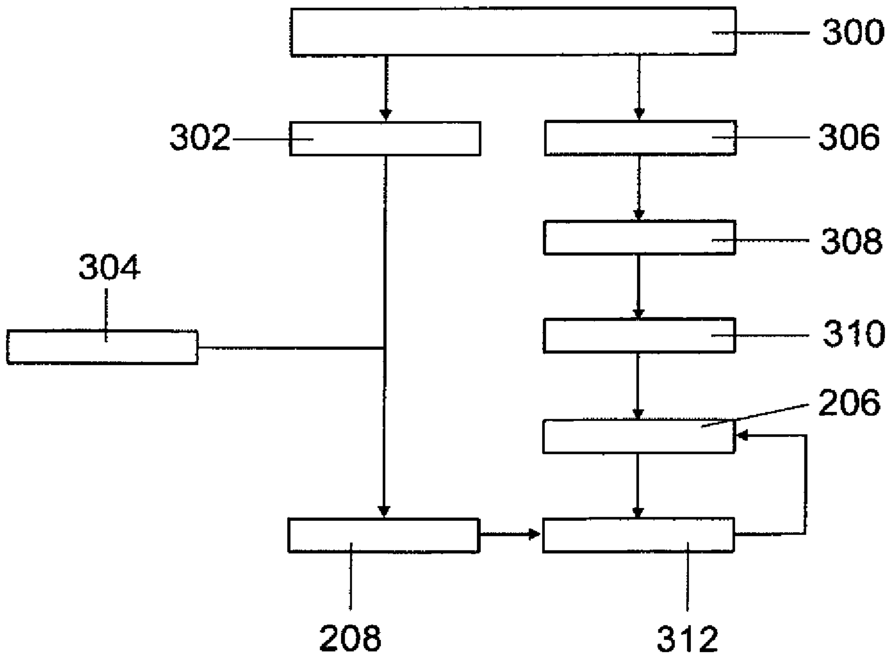

The flow-chart of FIG. 3 is representative of how, on a more general basis, starting from basic requirements for the system represented in FIG. 1 (input to a computing system in a step 300) reliability parameters are derived (in a manner known per se) in a step 302. The reliability parameters 302 are then used together with one or more models 304 (the aging model 204 of FIG. 1 being a possible case in point) to determine the minimum distance (step 208). The requirements input in the step 300 may also be used to derive optical performance parameters in a step 306. These optical parameters are used in a step 308 to define certain characteristics of the light source, such as the number of lighting points. The number of light sources (for instance three in the case of the arrangement shown in FIG. 1) may in turn be used in a step 310 to specify the arrangement of these light sources.

Figure 4A:
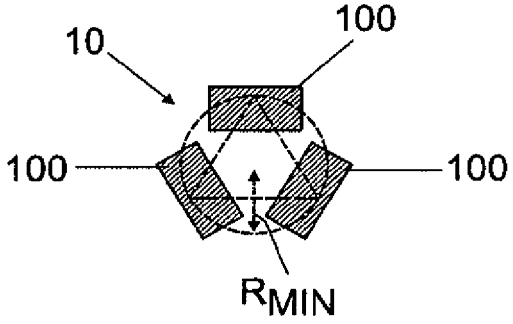
FIGS. 4*a* and 4*b* depict the steps of the design method described herein.

The two parts a) and b) of FIG. 4 show two possible arrangements of a plurality of light sources.

Figure 4B:
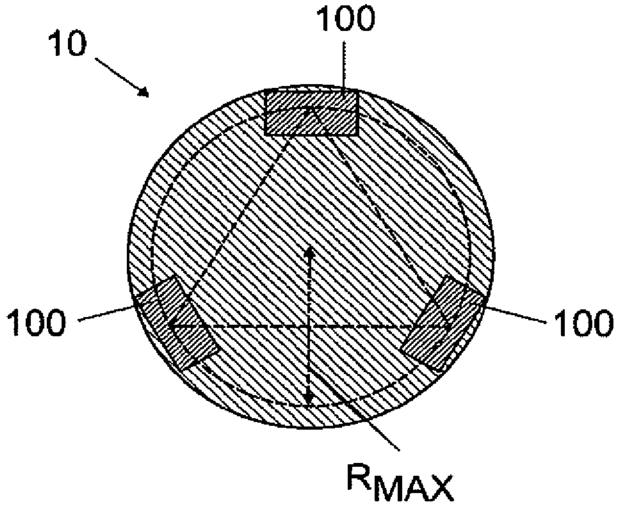

In the embodiment considered, three LED modules 100 are arranged in a circular-symmetric positioning layout (e.g. at the vertexes of a triangle). In that way, a minimum and a maximum value for the distance between adjacent LED modules can be determined e.g. as values for the radius of a notional circle over which the LED module are arranged. For instance, RMiN in FIG. 4*a* and RMAχ in FIG. 4*b* are representative of a minimum value and a maximum value, respectively.

Subsequently, starting from the thermal model 206 (see FIG. 3) the design parameters 312 of the optics 30 and the reflector 40 are determined for given value of the distance between the light modules 100. This process may include a number of iterations involving changes in the parameters in order to achieve an overall optimization.

In an embodiment where plural modules 100 are used, a circular symmetry in the positioning (as shown in FIG. 4) may be preferred. This positioning results in a simpler optical system with circular symmetry. Depending on the light module requirements (available space, final appearance, etc.) various approaches can be adopted in order to optimize different aspects of the optical system development.

Selecting the minimum value of spacing (i.e. RMiN in FIG. 4*a*), thus positioning the LED modules 100 as close as possible one to the other (by taking into account mechanical requirements, the intended package, electrical requirements such as minimum pads requirement) facilitates mixing of the different radiations coming from the different sources 100 and a effective point-like source appearance can be achieved.

Conversely, selecting the maximum value of spacing (i.e. RMAχ in FIG. 4*b*) corresponds to positioning the LED modules 100 as far as possible one from the other as the available space permits and facilitates separate light management for each source 10, resulting in a higher overall optical efficiency. In an embodiment, optimum design of the reflector 20 is a function of the characteristics of the associated light source and the light module requirements. Uni-polar reflectors (i.e. individual reflectors) or multi-polar reflectors can be developed. Depending on the light module requirements (desired shape of the radiation pattern, emission angle, color and intensity uniformity, and so on) reflector shape parameters and, should need arise, the number and the characteristics of facets in the reflector (s) can be defined. In the case of multi-polar arrangements, the axis of each reflector poles is arranged to be co-linear with the axis of each single light source.

Key parameters in reflector design such as dimension and shape and, in the case of multi-polar reflectors, number and characteristics of each individual reflector can be defined as a function of parameters such as:

- available space (x, y, z),
- light source characteristics,—air-gap dimension,
- required viewing angle,
- required colour uniformity,
- required intensity.

In an embodiment, the plastics optics 30 is developed together with reflector 20 in order to optimise light management. As a function of the plastics optics reliability requirements, the minimum air-gap between the optics lower surface and the light (and heat) source is set as described in the foregoing. Then, according to the optimum minimum air-gap value thus defined, the solid angle of light emission is divided in two zones, namely an external zone for higher angles and an internal zone for smaller angles.

The light rays of the external zone go directly to the reflector 20 while the light rays from the internal zone go to the plastics optics 30 where light is shaped by resorting to a lens-like effect and TIR. Good colour/intensity uniformity can be achieved by "pillows" structures.

Models such as the aging model 204 and the thermal model 206 can be either analytical models or models derived experimentally. In certain embodiments, these models lend themselves to be represented in very simple manner.

For instance, table I below provides an exemplary representation of air-gap dimensioning (step 208 of FIG. 2) based on reliability requirements as well as a plastic aging model and a light module thermal model.

| | |
|---|---|
| Required lifetime for plastics optics | Lifetime = 10 Kh |
| Maximum temperature for plastics optics | $T_{MAX\text{-}OPTICS}$ = 100° C. |
| Light module thermal model | $T_{SOURCE}$ = 130° C.,<br>T (P) = $T_{SOURCE}$ − 10° C./mm |
| Minimum air-gap | $D_{MIN\text{-}AIR\text{-}GAP}$ = 3 mm |

Briefly, in Table 1 the aging model 204 corresponds to the indication that, in order to ensure a lifetime of 10 kh (e.g.10, 000 hours without becoming exceedingly brittle and/or opaque), the temperature of the plastics optics 30 shall never exceed a threshold value of e.g. 100° C.

Such a model is applicable, for instance, if polycarbonate is selected for the plastics optics 30. The related data can be derived experimentally or may be already provided by the supplier of the material.

The thermal model 206 for the light module (which can be derived by experimental measurements) may indicate e.g. that the temperature in contact with the source is 13020 C. and that the temperature at a point P away from the source decreases of 10° C. as the distance increases by one millimeter.

This is of course an approximate linear model, provided just for better comprehension of the approach. More generally, the thermal model is a spatial function representative of the temperature generated by the light source 10.

In that way a minimum value DMIN_AIR-GAP of 3 mm is determined for the air gap.

The cover 40 represents an additional component applied to enclose the optical system into the light module enclosure or casing E. Also, the cover 40 can be used for optimizing spot shaping and colour/intensity mixing. In an embodiment, the cover 40 and the optics 30 are integrated to a single piece, thus reducing the costs relating to moulding as well as material and production costs.

The arrangement described herein permits to integrate the reflector 20, the plastics optics 30 and the cover 40 with the following advantages:

cost cutting associated with the use of plastics optics in the place of glass optics for high-flux, high-reliability applications, optimal definition of air-gap between the optics 30 and the light (and heat) source 10, high optical efficiency achieved by ensuring that all the light rays are properly "captured", optimum light management in terms of high optical efficiency and light shaping capability in unipolar or multi-polar reflector designs depending on the nature of the source (single or multiple),—the plastics optics 30 and the cover 40 can be integrated to a single piece, thus reducing costs relating to moulding operations and manufacturing components as well as production/assembly complexity and cost. Optical efficiency is also increased due to reduction of the inter-component optical interfaces traversed by the optical radiation.

Of course, without prejudice to the underlying principles of the invention, the details and embodiments may vary, even significantly, with respect to what has been described and illustrated by way of example only, without departing from the scope of the invention as defined by the annexed claims.

The invention claimed is:

1. A method of making an optical system including at least one light source and an optics subjected to aging as a result of exposure to said at least one light source, wherein the method comprises the steps of:

defining, using a computing system, an aging model for said optics;

defining, using the computing system, a thermal model for said at least one light source, wherein said thermal model is a spatial function representative of a temperature generated by said at least one light source;

defining a distance of said optics from said at least one light source as a function of said aging model and said thermal model to ensure a given lifetime for said optics, wherein said aging model defines a threshold temperature not to be exceeded by a material of said optics to ensure a given lifetime for said optics; and positioning said at least one light source away from said optics at least the defined distance and so that light from said at least one light source passes through said optics.

2. The method of claim 1, wherein said optics is a plastics optics.

3. The method of claim 1, further comprising the step of selecting said distance of said optics from said at least one light source as a minimum distance ensuring that the temperature of said optics as exposed to said at least one light source does not exceed said threshold temperature.

4. The method of claim 1, wherein said thermal model is representative of the temperature generated by said at least one light source as a function of the distance therefrom.

5. The method of claim 1, wherein said optical system includes a plurality of light modules, the method comprising the step of arranging said light modules according to a circular-symmetrical arrangement, wherein said plurality of light modules have a mutual distance therebetween.

6. The method of claim 5, further comprising the step of arranging said plurality of light modules at a minimum allowable distance therebetween.

7. The method of claim 5, further comprising the steps of:

defining a maximum space available for arranging said plurality of light modules, and arranging said plurality of light modules at a maximum distance admitted by maximum space available.

8. The method of claim 1, comprising, once said distance of said optics from said at least one light source is defined, the steps of:

partitioning a solid angle of light emission from said at least one light source in an internal zone and in an external zone, wherein light rays in said internal zone are directed to said optics to be shaped thereby, and providing at least one reflector to collect light rays in said external zone and direct them in the same direction of said light rays as shaped by said optics.

9. The method of claim 8, wherein said system includes a plurality of light sources, the method further comprising the step of providing said at least one reflector in the form of a multi-polar reflector.

10. The method of claim 1, wherein said optical system includes a plurality of light modules, the method further comprising the step of providing said optics in the form of a multiple, single-piece optics.

11. The method of claim 1, further comprising the steps of selecting a LED as said at least one light source.

12. An optical system designed according to the method of claim 1, the system also comprising a cover for the system, wherein said cover and said optics are integrated to a single piece.

13. The method of claim 1, wherein said optical system includes a plurality of light modules, the method further comprising the step of providing said optics in the form of a multiple, single-piece optics, with a pillow-like structure.

* * * * *